June 28, 1960 L. T. ZITELLI 2,943,234

CHARGED PARTICLE FLOW CONTROL APPARATUS

Filed Feb, 24, 1956 2 Sheets-Sheet 1

LOUIS T. ZITELLI
INVENTOR

BY Paul B. Hunter
ATTORNEY

LOUIS T. ZITELLI
INVENTOR

BY Paul B. Hunter
ATTORNEY

United States Patent Office 2,943,234
Patented June 28, 1960

2,943,234

CHARGED PARTICLE FLOW CONTROL APPARATUS

Louis T. Zitelli, Palo Alto, Calif., assignor to Varian Associates, San Carlos, Calif., a corporation of California Filed Feb. 24, 1956, Ser. No. 568,422

6 Claims. (Cl. 315—30)

This invention relates in general to flow control of charged particles and more specifically to novel high electrical current density control electrodes and to novel circuitry networks useful in conjunction with high power tube apparatus employing such electrodes.

The invention is extremely useful in the generation of high power, short rise and fall time pulses as are utilized in radar, pulse communication systems and the like. In radar work, for example, the fall time should be especially short so that in close range work the returning echo signal will not be masked by the trailing edge of the outgoing pulse.

One system utilized in the generation of pulses, for example for high power radar, employs a pulsed klystron amplifier operating into the transmitting antenna. In this system the R.F. output of the klystron was pulsed by pulsing on and off the klystron's beam current. The beam current was pulsed by applying a positive going high voltage pulse to the anode with respect to the cathode. The positive pulse in this system had to be substantially equal to the beam voltage of the tube (often 10 kv. or more). Short fall times, of such high voltage pulses, have been extremely difficult to achieve. These pulses have been plagued with long fall times, overshoot, and ripple. In the past the pulse was generally applied to the anode rather than to a control grid because the control grid used in the prior art intercepted sufficient current to operate at a very high temperature such that there was thermal emission from the control grid at a time when the tube was supposedly cut off thereby extending the fall time of the beam current pulses. Moreover, sporadic thermal emission from the hot grid during the beam current off period produced noise excitation in the output cavity resonator which would interfere with the incoming echo signal. The present invention provides novel improved means for the generation of short rise and fall time high power pulses.

Accordingly, the principal object of the present invention is to provide a novel high current density control apparatus whereby high power pulses having particularly short rise and fall time characteristics may be generated.

One feature of the present invention is a novel non-intercepting current control electrode disposed in close proximity to the charged particle emitter and adjacent the flow of charged particles whereby the flow of charged particles from the emitter may be effectively controlled or modulated with substantially no physical current interception by the control electrode.

Another feature of the present invention is a novel current control electrode of annular configuration disposed in surrounding relationship to a beam of charged particles and in close proximity to the particle emitter whereby high current density flow may be effectively controlled without physical current interception by the control electrode.

Figures 1, 2:
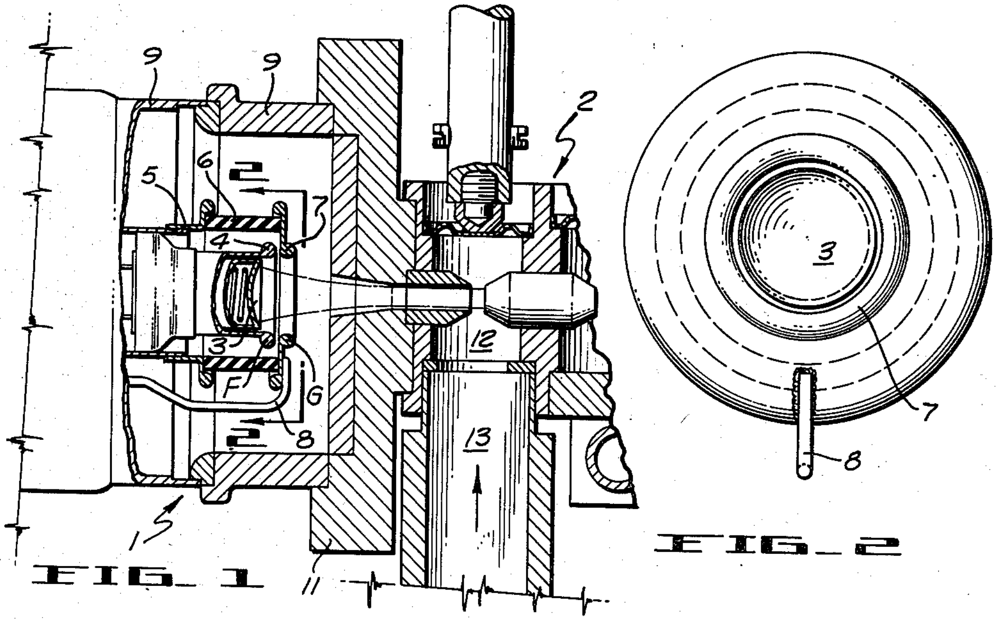
Figure 3:
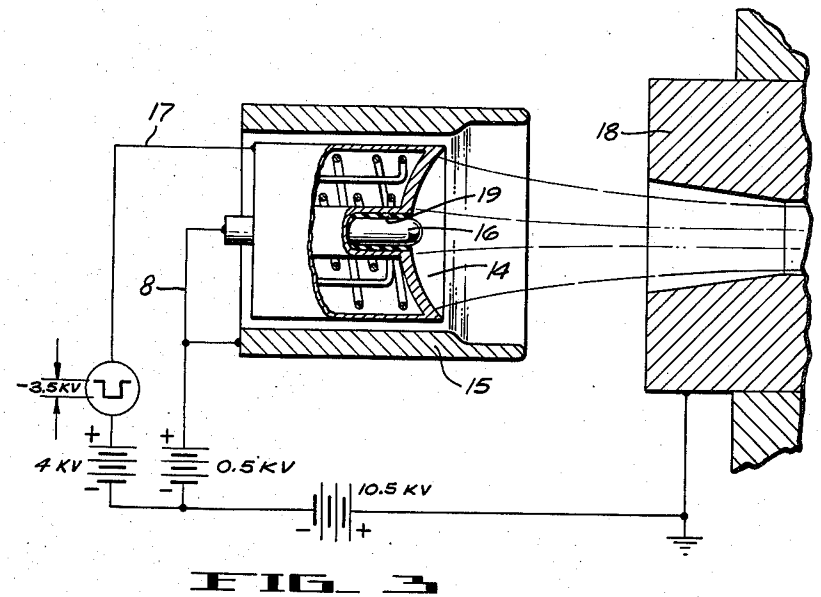
Figure 4:
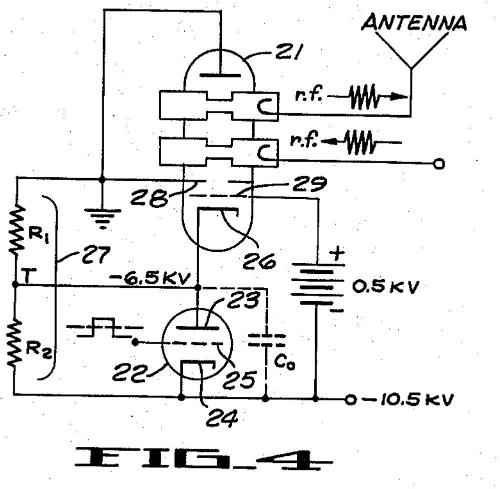
Figure 6:
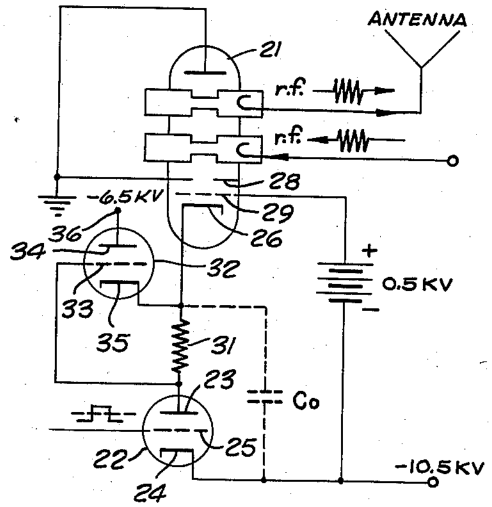
Figure 5:
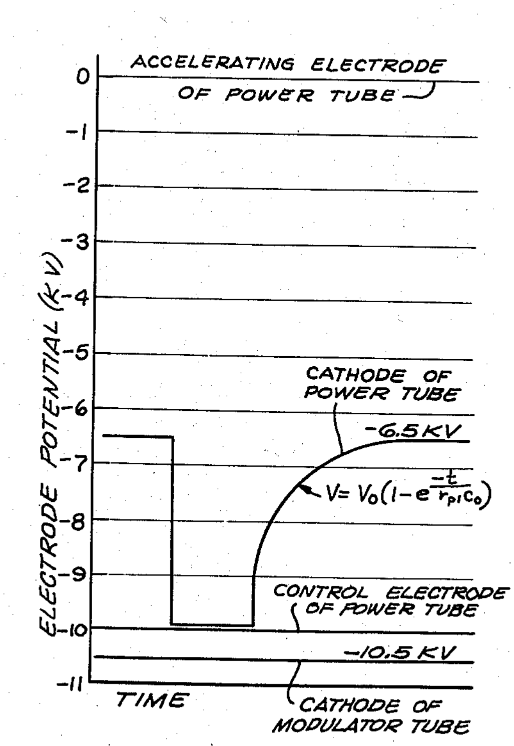
Figure 7:
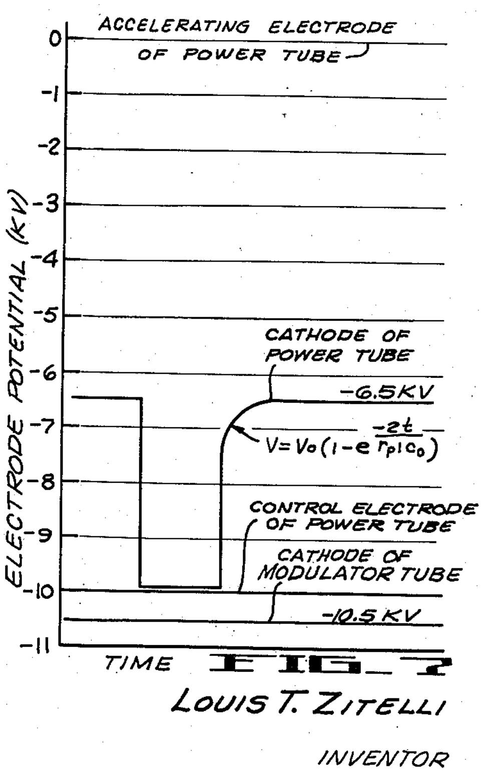

These and other features and advantages of the present invention will be more apparent after a perusal of the following specification taken in connection with the accompanying drawings, wherein Fig. 1 is a fragmentary longitudinal cross sectional view of a tube structure embodying the novel control electrode of the present invention, Fig. 2 is an enlarged view of a portion of the structure of Fig. 1 taken along line 2—2 in the direction of the arrows, Fig. 3 is a fragmentary longitudinal cross sectional view partly schematic showing a second novel current control electrode embodiment of the present invention, Fig. 4 is a circuit diagram of a novel pulse forming network, Fig. 5 is a graph of the potentials of certain electrodes as a function of time of the circuit of Fig. 4, Fig. 6 is a circuit diagram of another novel pulse forming network, and Fig. 7 is a graph of certain tube potentials as a function of time of the circuit of Fig. 6.

Similar characters of reference are used in all of the above figures to indicate corresponding parts.

The construction of the novel apparatus of the present invention will now be described. Several embodiments are presented and each novel construction will be immediately followed by a description of its operation.

The present invention will be described, to facilitate explanation, as it pertains to a pulse generating network employing a klystron amplifier as the output tube. It will be readily apparent to those skilled in the art that the scope of the present invention is not so limited and may be applied to many systems employing other types of output tubes such as traveling wave amplifiers, etc., wherein it is desirable to precisely control high current density flow.

Referring now to Fig. 1 there is shown a partial view of a high power klystron amplifier which incorporates the novel control electrode structure of the present invention. A cathode assembly 1 is shown mounted upon and in axial alignment with a multi-resonator R.F. section 2 which is disposed between the cathode assembly 1 and a collector assembly (not shown).

Included within the cathode assembly 1 is a cathode emitter 3. An annular cathode focus electrode 4 encircles the outer periphery of the cathode emitter 3 in slightly spaced relation therefrom and, in the present instance, is electrically tied to the cathode emitter. Although in the instant case the focus electrode 4 is at the same potential as the emitter 3, this is not a requirement and often will be found to be at a slightly different potential to give the desired focusing of the beam.

A cylindrical control electrode support 5 is rearwardly disposed outwardly and concentrically of the cathode emitter 3. A hollow cylindrical dielectric insulator 6 as of, for example, alumina ceramic is mounted on the forward outwardly flanged end of the control electrode support 5. The insulator 6 concentrically surrounds the cathode emitter 3. An annular control electrode 7 is carried transversely of and upon the forward end of the insulator 6. A control electrode lead 8 is connected to the control electrode 7 and provides a means for applying a voltage to the control electrode which is independent of the voltage applied to the cathode emitter 3.

The spacing between the mutually opposing portions of the focus electrode 4 and the current control electrode 7 is made as small as possible to give an effective control over the current flow. In the cathode configuration shown in Fig. 1 this spacing is approximately 0.015". The electrode spacing dimensions cited here are to be considered only exemplary and not in a limiting sense since the spacing that can be tolerated using a certain electrode configuration will depend upon the operating voltages of the opposing electrodes and the strength of the particle accelerating field.

The inside periphery of the apertured current control electrode 7 at G and the forward end of the focus electrode at F have been rounded to provide a relatively large radius of curvature at their closest mutually opposing portions. Moreover the surface of these electrodes at the rounded portions G and F have been highly polished to prevent sharp points which would quite likely produce electric arcs between the focus electrode 4 and the current control electrode 7 when high voltage differences were encountered in use.

An outer cathode envelope 9 surrounds the cathode emitter 3 and provides a gas-tight housing whereby the interior of the cathode assembly 1 may be evacuated. A transverse centrally apertured anode pole piece 11 carries the cathode envelope 9. The cathode assembly is positioned in axial alignment with the central anode aperture. A portion of the anode pole piece 11 is of magnetic material forming one pole of a permanent magnet, the yoke of which is not shown, which provides an axial focusing magnetic field whereby the electrons are confined in a beam shape as they proceed toward the collector end of the tube apparatus.

In operation a certain potential is applied to the cathode emitter 3. A more positive potential is applied to the anode pole piece 11. This establishes a certain voltage potential gradient between cathode emitter 3 and anode pole piece 11 which is sufficient to accelerate electrons emitted from the cathode 3 through the centrally apertured anode pole piece 11. When a sufficiently more negative potential than the cathode potential is applied to the current control electrode 7, a negative potential barrier is established between cathode 3 and anode 11 which will prevent the emitted electrons from being acted upon by the positive accelerating potential applied to the anode 11, thereby preventing the flow of beam current.

The degree to which the potential applied to the control electrode 7 must be more negative than the potential applied to the cathode 3 depends upon the strength of the accelerating field and the configuration and disposition of the control electrode 7. The control electrode configuration and disposition shown in Fig. 1, to effectively inhibit beam current, requires a control electrode voltage more negative than the cathode potential of approximately 60% of the potential difference between cathode 3 and anode 11. For example, if the anode-to-cathode voltage is 10 kv. the potential of the control electrode 7 must be 6 kv. more negative than the cathode potential. The focus electrode 4 acts in the conventional manner by focusing the emitted electrons into a beam of circular cross section.

A signal of a certain frequency is fed into an input resonator 12 by a waveguide 13. The electrons making up the beam pass through the input cavity resonator 12. Electromagnetic fields set up within the input cavity resonator 12 interact with the beam of electrons such as to velocity modulate the beam. The beam proceeds through successive intermediate cavity resonators (not shown) which further velocity modulate the beam. Thence the electrons enter an output cavity resonator wherein they impart electromagnetic energy to the cavity resonator. The electromagnetic energy is then coupled out of the output resonator (not shown) and propagated to the load as, for example, a transmitting antenna (not shown).

Referring now to Fig. 3 there is depicted a second embodiment of the present invention. Herein an apertured charged particle emitter 14 is provided and will deliver a hollow beam which sometimes is preferred for certain types of tubes. A hollow cylindrical current control electrode 15 is positioned in concentric surrounding relationship to the apertured cathode emitter 14 and has a free end portion overhanging the emitting surface of the cathode emitter 14. A central current control electrode 16 protrudes through the central aperture in the emitter 14. Although a central electrode is depicted this electrode need not be centrally disposed, for example, it could be a second hollow cylindrical electrode protruding through the emitter in a concentric fashion.

The cylindrical control electrode 15 and the central electrode 16 are shown electrically tied together and thus operate at substantially the same electrical potential. However, for some applications it may be desirable to have the two electrodes operating at different potentials. A cathode lead 17 provides an independent potential to the emitter 14. An anode lead supplies a more positive potential to a centrally apertured accelerating anode 18 than is applied to the cathode emitter 14. A current control electrode lead 8 supplies the operating potential to the control electrodes 15 and 16.

Surface discontinuities of the control electrodes and other tube electrodes operating at high voltages are made to have relatively large radii of curvatures whereby points of extremely high electric fields are minimized. Moreover the electrodes are polished to further prevent arcs between electrodes operating at different potentials. A hollow cylindrical dielectric insulator 19 as of, for example, alumina ceramic is disposed between the central control electrode 16 and the emitter 14.

In operation, the novel two-member current control electrode 15, 16 operates similarly to the previously mentioned annular current control electrode 7 and focusing electrode 4 combination. When the tube is drawing beam current the cylindrical control electrode 15 due to its forward overhanging portion provides the necessary focusing action to direct the emitted electrons into a beam passing through the centrally apertured accelerating anode 18. When a sufficiently more negative potential exists on the control electrodes 15 and 16 than exists on the cathode 14, a negative potential barrier is established between the cathode 14 and the anode 18 whereby beam current is effectively cut off. The instant two-member current control electrode configuration requires approximately only half of the potential difference between cathode and control electrode as required using the single control electrode 7. This two member current control electrode configuration is claimed in a copending divisional application.

The previously described electrode configurations may be utilized to advantage in controlling many high current density flow devices. The networks for establishing the desired operating potentials on the certain electrodes may be of varied form depending upon the desired objective of the apparatus, for example, modulating, pulse forming, etc.

Referring now to Fig. 4 there is shown a novel pulse generating network useful for producing short rise and fall time pulses. An output tube 21 as, for example, a multicavity klystron amplifier, as described supra, is connected in a first series circuit to a second modulating tube 22 as, for example, a power triode having a plate 23, a cathode 24, and a control grid 25. The plate 23 is connected to a cathode 26 of the power tube 21. A potential divider branch 27 consisting of a first resistor $R_1$ and a second resistor $R_2$ is parallel connected with the first series circuit or branch. A tap T of the potential divider branch is connected to the cathode 26 of the power tube 21. One end of the potential divider branch 27 is connected to an accelerating electrode 28 of the power tube 21. The other end of the potential divider branch is connected to the cathode 24 of the modulator tube.

The accelerating electrode 28 of the power tube 21 is connected to ground. The cathode 24 of the modulator tube is connected to a certain potential which is substantially more negative than ground, for example, −10.5 kv. A current control electrode 29 of the power tube 21 is connected to a potential slightly more positive than the cathode 24 of the modulator tube 22, as of, for example, at −10.0 kv. The control grid 25 of the modulator tube 22 is biased at cutoff. The current flow through the potential divider branch 27 establishes a potential on the cathode 26 of the power tube 21 substantially more positive than the potential of its current control electrode 29 as of, for example, −6.5 kv.

In operation, before any initiating signals are introduced, both the power tube 21 and the modulator tube 22 are biased at cutoff. The only current flowing is through the potential divider branch 27 which establishes the potential of the cathode 26 of the power tube 21.

When a positive going initiating pulse is received at the grid 25 of the modulator tube 22 the beam of the modulator tube 22 is turned on and the modulator tube's effective resistance diminishes to a small amount thereby establishing the cathode 26 of the power tube 21 at a potential slightly higher than the potential of the cathode 24 of the modulator tube 22. For example, when the modulator tube is turned on the cathode of the power tube 26 is dropped to approximately a potential equal to or preferably slightly more positive than −10.0 kv. The potential of the current control electrode 29 of the power tube 21 remains fixed at −10.0 kv. Thus at this time −10.0 kv. exists between the power tube's accelerating electrode 28 and its cathode 26 and substantially no potential barrier exists due to the current control electrode 29. The beam of the power tube 21 is turned on. An R.F. signal applied to the input cavity of the power tube 21 is then amplified and propagated to the load.

When the end of the positive going initiating pulse arrives at the grid 25 the modulator tube 22 is cut off. This initiates the return of the cathode 26 of the output tube 21 to the voltage divider bias condition, for example, in the instant case, −6.5 kv. When the cathode of the power tube 21 reaches a sufficiently more positive potential than its current control electrode 29 which remains at −10.0 kv. the power tube is cut off and the R.F. signal can no longer be amplified and thus the R.F. output pulse is terminated.

At this point it is necessary to examine more carefully the characteristics of the pulse generating circuit. Upon a closer analysis of the modulator tube 22 it will be found that there are certain electrode capacitances and stray wiring capacitances associated with the modulator tube 22 and its attendant wiring. This capacitance can be lumped into an equivalent capacitance represented by capacitor $C_0$ shunting the modulator tube 22. The electrical effect of this shunting capacitance is to draw current to charge the capacitor $C_0$ when a voltage is suddenly applied across its terminals. The charging current in the present network is primarily drawn through the output tube 21 as beam current. Thus the beam current of the output tube 21 falls off exponentially rather than cutting off instantaneously. Another way to look at this is to say the voltage goes more positive across the capacitor as shown by the following relationship:

$$V=V_0\left(1-e^{\frac{-t}{RC}}\right)$$

where V is the instantaneous voltage across the capacitor $C_0$, $V_0$ is the applied potential difference in the network, $t$ is the time in seconds, R is the resistance through which the charge must flow to charge the capacitor $C_0$, and C is the capacitance of the capacitor $C_0$. This means the potential of the power tube's cathode 26 will raise in substantially an exponential manner thus causing the fall time of the beam current pulse to be lengthened a small amount over zero fall time.

The fall time of the beam current pulse, as can be seen from the above relationship, varies directly with the resistance through which the capacitor $C_0$ charging current must flow. In the circuit of Fig. 4 the value of R is equal to the resistance of the conducting power tube ($r_{p_1}$) in parallel with the first potential divider resistors $R_1$ and $R_2$. Thus the total resistance $$R=\frac{1}{\frac{1}{R_1}+\frac{1}{r_{p_1}}+\frac{1}{R_2}}$$

but assuming $R_1$ and $R_2$ are individually much, much greater than $r_{p_1}$ then $R \cong r_{p_1}$. See Fig. 5 for a graph of certain aforementioned electrode potentials as a function of time.

A second novel pulse generating circuit is shown in Fig. 6 wherein the fall time characteristics of the pulse are considerably improved. As in the previous network of Fig. 4 an output tube 21 as, for example, a high power klystron amplifier is placed in series with a pulse modulating tube 22. A small reference resistor 31 as of, for example, 70 ohms is interposed in the series circuit between the output tube 21 and the modulating tube 22. A restorer tube 32 having a control grid 33, plate 34, and cathode 35 as, for example, a 4–65A (a tetrode) is provided having the reference resistor 31 series connected in its cathode-to-grid circuit. In this way when full beam current flows through the series branch it will develop a potential drop across the reference resistor 31 which will negatively bias the third tube 32 below cutoff.

The plate 34 of the restorer tube 32 is connected to a constant potential source 36 intermediate of the modulator cathode's low potential and ground as, for example, −6.5 kv. As in the previous circuit the current control electrode 29 of the output tube 21 is set at a certain potential more positive than the cathode 24 of the modulator tube 22 as, for example, −10.0 kv. The accelerating electrode 28 of the output tube 21 may be set at ground potential. The modulator tube 22 is biased at cutoff.

A positive going pulse applied to the grid of the modulator tube 22 turns its beam current on and immediately drops the cathode 26 of the output tube 21 to approximately a potential equal to or preferably slightly more positive than −10.0 kv. This immediately turns on the beam current in the output tube 21. An R.F. signal applied to the input cavity is amplified and propagated to the antenna.

When the end of the positive going initiating pulse arrives at the grid 25 of the modulator tube 22, the modulator tube 22 again returns to the cutoff state and current through the series branch terminates. When the series current stops there is no voltage drop across the reference resistor 31 and thus no negative bias on the grid of the restorer tube 32. Hence the restorer tube 32 draws space current and tends to immediately raise the potential of the cathode 26 of the output tube 21 to the potential of the plate 34 of the third tube 32 (−6.5 kv.).

However, here again the capacitance $C_0$ shunting the modulator tube 22 would tend to cause the cathode voltage of the output tube 21 to raise in an exponential manner as shown by the previously described relationship $$V=V_0\left(1-e^{\frac{-t}{RC}}\right)$$

In this network R in the above relationship is reduced over the first novel circuit. Thus the fall time is less than that for the first circuit because the current to charge the capacitor $C_0$ may come through the lower resistance $r_{p_2}$ of the restorer tube 32 as well as from the output tube's beam current. In other words, the total $$R=\frac{r_{p_1}\times r_{p_2}}{r_{p_1}+r_{p_2}}$$

and if $r_{p_1}=r_{p_2}$ then $R=\frac{1}{2}r_{p_1}$ or half the resistance of the first described network which should give one-half the fall time of the first circuit.

Decreasing the fall time of the beam current pulse likewise cuts the R.F. pulse off at a faster rate resulting in the desired short fall time characteristics of the R.F.

output pulse. The above-described pulse generating networks are claimed in a copending divisional application.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A high power high frequency velocity modulation electron tube apparatus including, a cathode emitter for emitting a high current beam of electrons, an accelerating electrode disposed in alignment with said emitter and adapted to be operated at a potential more positive than 9 kv. with respect to said cathode emitter when the tube is conducting, a centrally apertured current control electrode disposed between said cathode emitter and said accelerating electrode in close spatial proximity to said emitter, the inside periphery of said control electrode disposed encircling the outside periphery of the beam, and means for applying only a negative variable modulating potential of a peak magnitude of at least 2 kv. to said control electrode with respect to said cathode emitter whereby the beam current flow through said current control electrode may be easily initiated or inhibited as desired without intercepting electron current thereon to produce undesired emission therefrom.

2. A high frequency high power velocity modulation electron tube apparatus including, a cathode emitter for emitting a high current beam of electrons, an anode having a high accelerating potential of at least 9 kv. applied thereto for accelerating the emitter electrons to high velocity, and electron focus electrode closely spaced from and encircling said cathode emitter for focusing the emitted electrons into a beam, an apertured current control electrode closely spaced from said focus electrode and the inside periphery of the aperture in said control electrode disposed encircling the outside periphery of the electron beam path, and means for applying only a negative variable potential having a peak magnitude of at least 2 kv. to said control electrode with respect to said cathode emitter whereby the beam current may be effectively controlled without the control electrode physically intercepting the emitted electrons, which would otherwise produce thermal heating of said control electrode producing undesired emission therefrom, in use.

3. In an apparatus as claimed in claim 2, a control electrode support means coupled to said cathode emitter, and an insulator means carried by said control electrode support means and having said current control electrode supported therefrom, said electron focus electrode being coupled to said cathode emitter, whereby said emitter, said focus electrode and said current control electrode comprise an integral unit to facilitate tube assembly and procurement of proper electrode spacings.

4. A high power high frequency velocity modulation electron tube apparatus including, a cathode emitter for emitting a high current beam of electrons, said cathode emitter being physically substantially of spherical section, an accelerating electrode having a centrally disposed opening therein in alignment with said emitter and adapted to be operated at a potential more positive than 9 kv. with respect to said cathode emitter when the tube is conducting, said accelerating electrode having a flared entrance to its central aperture and the point of minimum diameter of said central aperture being substantially less than the cross section of said cathode emitter, said accelerating electrode being arranged to produce a radial flow of electrons from said cathode emitter through the central opening in said accelerating electrode, a centrally apertured current control electrode disposed between said cathode emitter and said accelerating electrode the inside periphery of said control electrode disposed encircling the outside periphery of the beam, and means for applying only a negative variable modulating potential of a peak magnitude of at least 2 kv. to said control electrode with respect to said cathode emitter whereby the beam current flow through said current control electrode may be easily initiated or inhibited as desired without intercepting electron current thereon to produce undesired emission therefrom.

5. The apparatus according to claim 4 including a centrally apertured focus electrode disposed between said cathode emitter and said current control electrode, the inside periphery of the central aperture in said focus electrode disposed encircling the outside periphery of the beam and said focus control electrode operating at substantially the same electrical potential as said cathode emitter.

6. The apparatus according to claim 4 wherein said means for applying a negative modulating potential to said control electrode with respect to said cathode emitter includes means for holding the potential of said control electrode at a substantially fixed potential, means for holding said cathode emitter at a cut off potential more positive than said control electrode potential by at least 2 kv., and means for periodically pulsing said cathode emitter to a potential slightly more positive than said control electrode for initiating a pulse of beam current flow from said cathode emitter.

References Cited in the file of this patent

UNITED STATES PATENTS

| | | |
|---|---|---|
| 2,069,507 | Rust et al. | Feb. 2, 1937 |
| 2,099,846 | Farnsworth | Nov. 23, 1937 |
| 2,182,185 | Trump | Dec. 5, 1939 |
| 2,290,377 | Molinari | July 21, 1942 |
| 2,410,863 | Broadway et al. | Nov. 12, 1946 |
| 2,451,813 | Dickerson | Oct. 19, 1948 |
| 2,515,997 | Haeff | July 18, 1950 |
| 2,543,082 | Webster | Feb. 27, 1951 |
| 2,556,978 | Pierce | June 12, 1951 |
| 2,733,365 | Hoagland | Jan. 31, 1956 |
| 2,782,334 | Gardner | Feb. 19, 1957 |
| 2,829,299 | Beck | Apr. 1, 1958 |
| 2,852,716 | Lafferty | Sept. 16, 1958 |